United States Patent
Luken et al.

(10) Patent No.: US 8,136,357 B2
(45) Date of Patent: Mar. 20, 2012

(54) TURBOCHARGED ENGINE USING AN AIR BYPASS VALVE

(75) Inventors: Todd R. Luken, Dublin, OH (US);
James S. Robinson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 842 days.

(21) Appl. No.: 12/199,319

(22) Filed: Aug. 27, 2008

(65) Prior Publication Data

US 2010/0050630 A1 Mar. 4, 2010

(51) Int. Cl.
*F03B 33/44* (2006.01)
(52) U.S. Cl. .......................... 60/611; 60/285
(58) Field of Classification Search ............ 60/611, 60/280, 285, 288; *F03B 33/44*
See application file for complete search history.

(56) References Cited

U.S. PATENT DOCUMENTS

| | | | |
|---|---|---|---|
| 3,992,878 A | 11/1976 | Moorman | |
| 4,459,809 A | 7/1984 | Tadokoro et al. | |
| 4,489,702 A | 12/1984 | Cholvin et al. | |
| 5,297,532 A | 3/1994 | Ikebe et al. | |
| 5,724,813 A | 3/1998 | Fenelon et al. | |
| 6,062,026 A * | 5/2000 | Woollenweber et al. | 60/605.2 |
| 6,134,888 A | 10/2000 | Zimmer et al. | |
| 6,276,139 B1 * | 8/2001 | Moraal et al. | 60/605.2 |
| 6,295,816 B1 * | 10/2001 | Gallagher et al. | 60/611 |
| 6,370,871 B2 * | 4/2002 | Suzuki et al. | 60/286 |
| 6,434,938 B1 | 8/2002 | Sun et al. | |
| 6,457,312 B2 * | 10/2002 | Fahringer et al. | 60/611 |
| 6,546,721 B2 * | 4/2003 | Hirota et al. | 60/297 |
| 6,637,204 B2 * | 10/2003 | Ellmer et al. | 60/606 |
| 6,851,256 B2 | 2/2005 | Chamoto et al. | |
| 6,990,814 B2 * | 1/2006 | Boley et al. | 60/611 |
| 7,010,914 B1 | 3/2006 | Roberts, Jr. et al. | |
| 7,080,511 B1 | 7/2006 | Bolton et al. | |
| 7,426,830 B2 * | 9/2008 | Schorn et al. | 60/612 |
| 2006/0276955 A1 | 12/2006 | Kein | |
| 2009/0077968 A1 * | 3/2009 | Sun | 60/605.2 |

FOREIGN PATENT DOCUMENTS

JP 11315740 A * 11/1999

OTHER PUBLICATIONS

JP 11-315740 Translation, Jun. 25, 2011, JPO, http://dossier.ipdl.inpit.go.jp/text_trans.html.*
JP 11315740 English abstract, Jun. 25, 2011, East Database.*

* cited by examiner

*Primary Examiner* — Quyen Leung
*Assistant Examiner* — Thomas Truong
(74) *Attorney, Agent, or Firm* — Plumsea Law Group, LLC; Mark E. Duell (57) ABSTRACT

A system to cool exhaust gas entering a catalytic converter in a turbocharged engine is disclosed. An air bypass valve is controlled to vent pressurized air to the atmosphere to overrev a turbocharger when exhaust gas exceeds a predetermined temperature. The rotation of the turbocharger increases to maintain a desired boost pressure. When this occurs, the turbocharger absorbs more energy from the exhaust gas to maintain the desired boost pressure. Thus, the exhaust gas entering the catalytic converter is cooled.

22 Claims, 6 Drawing Sheets

TURBOCHARGED ENGINE USING AN AIR BYPASS VALVE

BACKGROUND

1. Field of the Invention

The invention relates to turbocharged engines, and more particularly to the control of an air bypass valve in a turbocharged engine.

2. Background of the Invention

In general, air bypass valves are known in the art. Air bypass valves are typically operated to prevent compressor surge during various throttle changes. For example, U.S. Pat. No. 7,010,914 to Roberts et al. employs an air bypass valve to prevent a compressor surge on turbocharged engines. Roberts selectively opens a pressure control valve to discharge intake air to reduce compressor outlet pressure and prevent such a surge without changing the throttle position. Roberts is directed to maintaining a shaft speed of turbocharger during enriched operation, such as cleaning NOx traps.

U.S. Pat. No. 6,851,256 to Chamoto et al. discloses the use of variable geometry vanes to cool engine exhaust in a turbocharged engine. In addition, Chamoto controls a bypass passage to control the amount of exhaust gas flowing to the turbine. The bypass passage leads exhaust gas from upstream of the turbine to skip the turbine to control the amount of exhaust gas entering the turbine. When the exhaust gas temperature is greater than a predetermined temperature the control valve closes and more exhaust gas flows to the turbine. Chamoto, however, requires additional expense and complexity to cool the exhaust gas.

There is a need for an efficient and effective exhaust gas cooling system that responds quickly to temperature fluctuations and mitigates problems associated with related art systems.

SUMMARY

Embodiments of the present invention can include a turbocharged engine system having an engine, an air inlet to provide air to the engine, an air bypass valve that vents air from the air inlet, a turbocharger disposed in the air inlet, a catalytic converter located downstream of the engine, and an air bypass valve controller to open the air bypass valve when an exhaust gas temperature entering the catalytic converter exceeds a predetermined temperature.

In another aspect, the air bypass valve controller predicts the exhaust gas temperature.

In another aspect, the system includes at least one sensor, wherein the air bypass valve controller predicts the exhaust gas temperature based on information received from the at least one sensor.

In another aspect, the system includes an exhaust gas temperature sensor, wherein the exhaust gas temperature sensor measures the exhaust gas temperature and transmits the measured exhaust gas temperature to the air bypass controller.

In another aspect, the turbocharger is configured to rotate faster to compensate for pressure lost by opening the air bypass valve.

In another aspect, the system includes a fuel injection system, wherein the fuel injection system is configured to provide fuel to the engine in a lean state when the air bypass valve is opened.

In another embodiment, the present invention can include a method for cooling exhaust from a turbocharged engine, comprising the steps of determining the temperature of an engine exhaust gas, determining if the predicted exhaust gas temperature is above a predetermined temperature, and venting pressurized intake air upstream of the turbocharger if the predicted temperature is above the predetermined temperature.

In another aspect, the method includes spinning the turbocharger to maintain air pressure upstream of the turbocharger while the pressurized air is vented to the atmosphere.

In another aspect, the step of determining the exhaust gas temperature includes measuring the exhaust gas temperature.

In another aspect, the step of determining the exhaust gas temperature includes predicting the exhaust gas temperature according to engine operating conditions.

In another aspect, the method includes providing a fuel air mixture to the engine during the step of venting.

In another aspect, the pressurized air is vented to the atmosphere.

In another aspect, the method includes measuring a boost pressure, determining if the boost pressure is falling, and reducing the venting of the pressurized air if the boost pressure is determined to be falling.

In another aspect, the venting of the pressurized air includes opening an air bypass valve upstream of the engine and downstream of the turbocharger.

In another aspect, the method includes measuring a boost pressure, determining if the boost pressure exceeds a predetermine boost pressure limit, and closing an air bypass valve if the measured boost pressure exceeds the predetermined boost pressure limit.

In another aspect, the method includes determining if the determined exhaust gas temperature is below a predetermined lower temperature limit, and stopping the venting of the pressurized intake air if the determined exhaust gas temperature is below the predetermined lower temperature limit.

According to another embodiment of the present invention, the method can include an engine, an air inlet to provide air to the engine, a turbocharger having a an impeller to pressurize air entering through the air inlet to the engine and a turbine to convert exhaust gas into rotational energy to spin the impeller, a bypass valve disposed between the impeller and the engine, the bypass valve configured to selectively vent the pressurized air, and a bypass controller configured to determine exhaust gas temperature and to open the bypass valve when the engine exhaust temperature exceeds a predetermined temperature.

In another aspect, the system includes a bypass valve that vents the pressurized air to atmosphere when the engine exhaust gas temperature exceeds a predetermined temperature.

In another aspect, the bypass controller is configured to determine if a turbine overpressure event is occurring and the bypass controller opens the bypass valve when the turbine overpressure event occurs.

In another aspect, the air bypass valve is configured to vent the pressurized air to a portion of the air inlet upstream of the turbocharger during the turbine overpressure event.

In another aspect, the engine operates in a lean state when the engine exhaust temperature exceeds a predetermined temperature and the bypass controller has opened the air bypass valve.

In another aspect, the engine operates in an enriched state when the bypass controller opens the air bypass valve and the engine exhaust temperature remains above predetermined temperature.

In another aspect, the engine is configured to maintain a lean operating state when the engine operates at a high engine output to maintain a predetermined exhaust gas temperature.

In another aspect, the engine is configured to operate in an enriched state after the air bypass valve is opened and the engine exhaust temperature is greater than the predetermined exhaust gas temperature.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION

Embodiments of the present invention help cool exhaust gasses that enter a catalytic converter. The exhaust gas temperatures can exceed a predetermined temperature range when a turbocharged engine is in a high power output operation. Embodiments of the present invention can cool exhaust gasses without enriching the fuel air ratio. Because the turbocharged engine can operate at a high power mode without using extra fuel, the turbocharged engine having can have an increased fuel efficiency.

Figure 1:
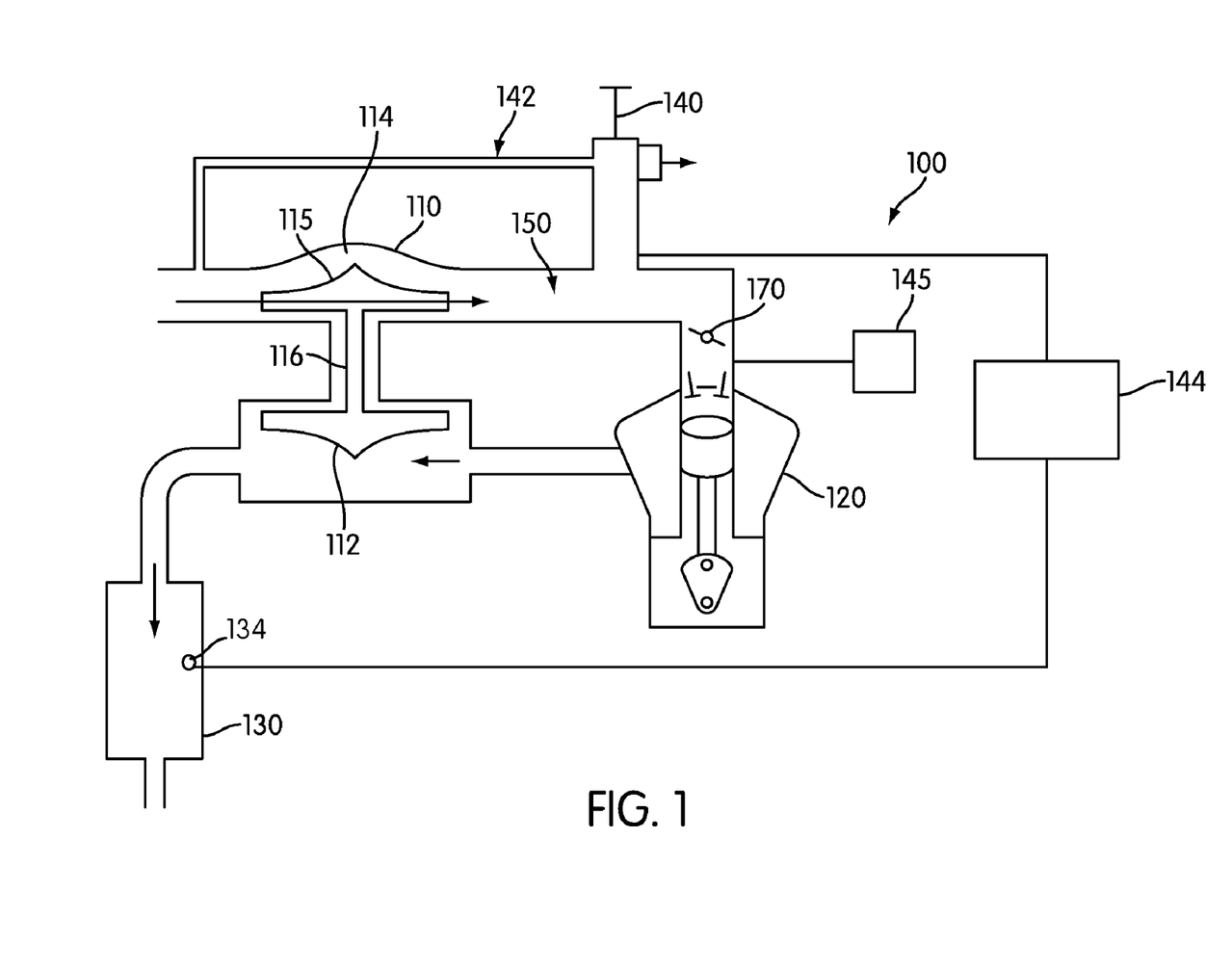
FIG. 1 is a schematic diagram of an exemplary embodiment of a turbocharged engine assembly.

FIG. 1 is a schematic diagram of an exemplary embodiment of turbocharged engine assembly 100. Referring to FIG. 1, turbocharged engine assembly 100 includes turbocharger 110, engine 120, catalytic converter 130, and air bypass valve 140. In some cases, air is supplied to engine 120 through air inlet passage 150. In some cases, turbocharger 110 is provided in air inlet passage 150. Turbocharger 110 pressurizes the air upstream of turbocharger 110 that is supplied to engine 120. The pressurized air can also be referred to as boost or boost pressure. In some embodiments, throttle 170 is upstream of turbocharger 110 to regulate the flow of pressurized air into engine 120.

Turbocharger 110 may include turbine 112 and compressor 114. Compressor 114 and turbine 112 may share common shaft 116. As can be observed, exhaust gas from engine 120 propels turbine 112 which in turn causes compressor 114 to spin. As compressor 114 spins, the air in air inlet passage 150 after compressor 114 is pressurized by impeller 115 of compressor 114.

Throttle 170 controls the flow of the pressurized air into engine 120. The position of throttle 170 generally determines the amount of air entering engine 120. In an exemplary embodiment, throttle 170 is located downstream from air bypass valve 140 in air inlet passage 150.

In some cases, air bypass valve 140 vents the pressurized air from air inlet passage 150 to the atmosphere outside the engine. In an exemplary embodiment, air bypass valve 140 is located on air inlet passage 150 downstream of turbocharger 110 and upstream of throttle 170. Air bypass valve 140 may be controlled by air bypass controller 144 (also referred to as controller 144) that opens or closes air bypass valve 140. In some embodiments, an air pressure sensor (not shown) can be placed in air inlet passage 150 to determine the air or boost pressure. Data from the air pressure sensor can be provided to controller 144.

In some embodiments, air bypass valve 140 can be a three way valve. The three way air bypass valve can be controlled to vent the pressurized air to the atmosphere or to another portion of air inlet passage 150. The pressurized air can be vented to a portion of air inlet passage 150 before turbocharger 110 through bypass duct 142.

The pressurized air is mixed with fuel and this fuel-air mixture is introduced in engine 120. Engine 120 combusts the air fuel mixture to provide power. The exhaust gas from engine 120 leaves engine 120. In some cases, as the exhaust gas leaves engine 120, the exhaust gas performs work on turbine 112, causing both turbine 112 of turbocharger 110 and compressor 114 to spin. The exhaust gas then enters catalytic converter 130.

A turbocharged engine assembly may include provisions for determining the temperature of a catalyst within a catalytic converter. In some cases it may be difficult to directly measure the catalyst temperature and therefore a turbocharged engine assembly can include provisions for indirectly determining the temperature of the catalyst. In one embodiment, the temperature of exhaust gas associated with a catalytic converter can be measured in order to estimate the approximate temperature of the catalyst.

In some embodiments, exhaust gas sensor 134 is provided in or near catalytic converter 130. In some cases, exhaust gas sensor 134 is configured to determine the exhaust gas temperature of the exhaust. In particular, exhaust gas sensor 134 can determine the temperature of the exhaust gas entering catalytic converter 130. Exhaust gas temperature data from exhaust gas sensor 134 can be transmitted to air bypass controller 144. With this arrangement, the temperature of the catalyst of catalytic converter 130 can be estimated using information about the exhaust gas temperature.

Catalytic converter 130 reduces harmful emissions from the exhaust gas. Typically, catalytic converter 130 has a preferred temperature operating range. In temperatures below the preferred temperature operating range, catalytic converter 130 does not properly function and the exhaust gas may not be fully treated. When exhaust gas temperatures are greater than the preferred temperature range, catalytic converter 130 is less efficient and can be damaged.

Because catalytic converter 130 is least efficient during cold start up, catalytic converter 130 can be placed close to engine 120. By placing catalytic converter 130 close to engine 120, the exhaust gas can more quickly transfer heat energy to catalytic converter 130. As a result, the cold start up period is minimized and catalytic converter 130 quickly reaches the preferred temperature operating range. Another consequence of the close placement of catalytic converter 130 to engine 120 is that relatively hot exhaust gas can heat catalytic converter 130 beyond the preferred operating temperature range.

During a period of high power output, the exhaust gas from engine 120 will have a higher temperature than during idle or normal operation. Accordingly, as throttle 170 opens, the exhaust gas temperature will increase. In addition, other engine activity, such as increased engine speed (high revolutions per minute) operation, may similarly cause high exhaust gas temperatures. In some instances, the exhaust gas temperature can become so hot, that the performance of catalytic converter 130 may be degraded or catalytic converter 130 may even be damaged by the exhaust gas.

In an exemplary embodiment, air bypass controller 144 is configured to open air bypass valve 140 when the exhaust gas temperature exceeds a predetermined threshold. By opening air bypass valve 140 during a high engine output cycle, turbocharger 110 must consume more energy to maintain the boost pressure as air leaves through air bypass valve 140. Specifically, compressor 114 will have to perform more work to maintain desired high boost pressure for engine 120. To perform the required work, turbine 112 and compressor 114 must increase rotational velocity. Compressor 114 extracts more energy from the exhaust gas. As a result of the opening of air bypass valve 140, the exhaust gas will lose energy as the exhaust gas performs the work on turbine 112. This in turn causes the exhaust gas temperature to be lowered.

In some embodiments, an estimate of the exhaust gas temperature based on engine operating conditions is used to control air bypass controller 144. For example, the exhaust gas temperature can be predicted if an engine condition exceeds a predetermined limit. For example, the predetermined limit can be a temperature limit based on throttle position, fuel consumption, time of engine operation, revolutions per minute, vehicle speed, and boost pressure.

Figure 2:
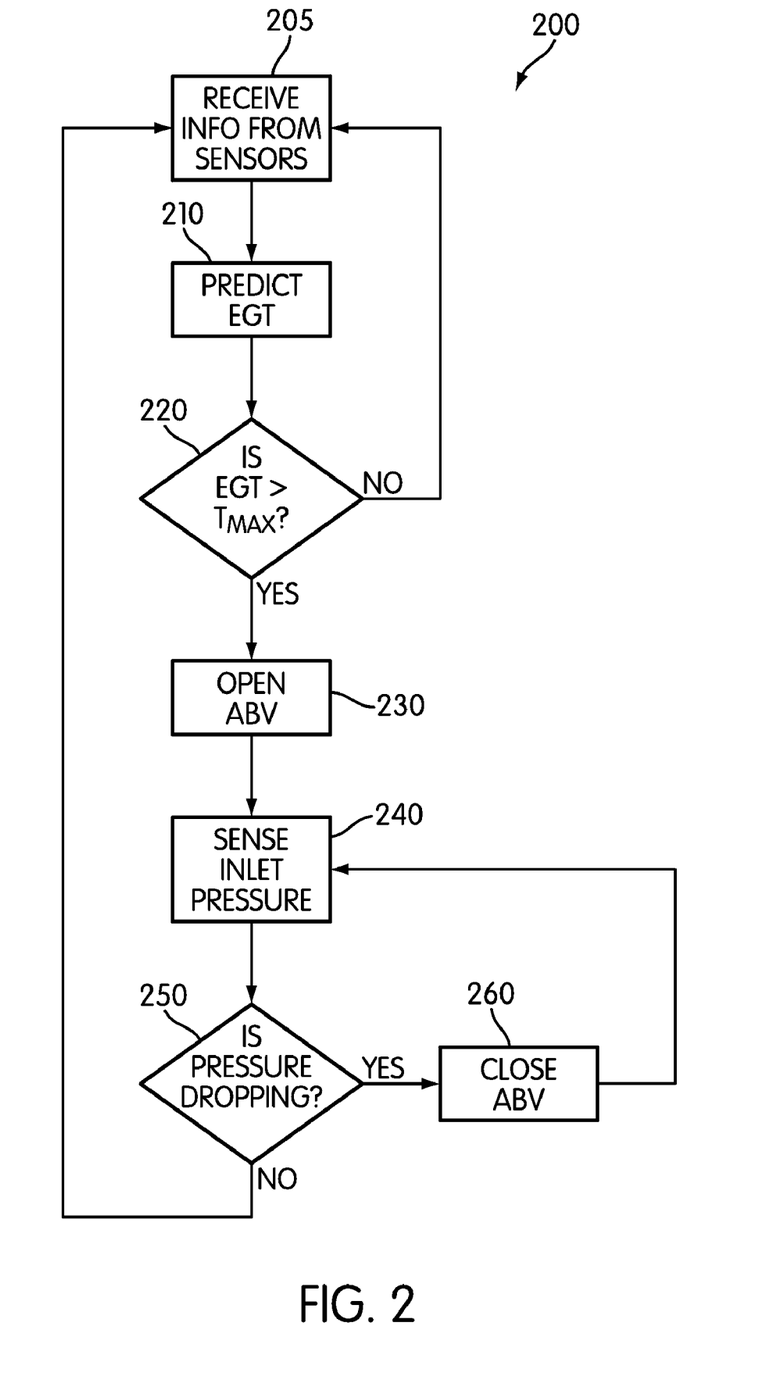
FIG. 2 is a schematic diagram according to an embodiment.

In some embodiments, the position of throttle 170 can be used to determine exhaust gas temperature. FIG. 2 is a schematic diagram according to an embodiment that opens air bypass valve 140 based on engine operating conditions. Referring to FIG. 2, method 200 can be used to open air bypass valve 144 based on a predicted exhaust gas temperature.

In step 205, information from a sensor is received. In step 210, the exhaust gas temperature is predicted from the sensor information. As described above, the exhaust gas temperature can be estimated based on one or more measured engine operating parameters. After step 210, in step the estimated exhaust gas temperature is compared to a predetermined maximum exhaust gas temperature. If the estimated exhaust gas temperature is not greater than the maximum exhaust gas temperature, the method returns to step 210. Otherwise, method 200 proceeds to step 230 in which air bypass valve 140 is opened by a predetermined amount.

In some embodiments, method 200 determines if air pressuring is dropping in step 250, by measuring boost pressure in air inlet passage 150. If the boost pressure is above the predetermined pressure, method 200 returns to step 210. If the boost pressure is below the predetermined pressure, method 200 proceeds to step 260 to close air bypass valve 140 by a predetermined amount. After step 260, method 200 returns to step 240.

Figure 3:
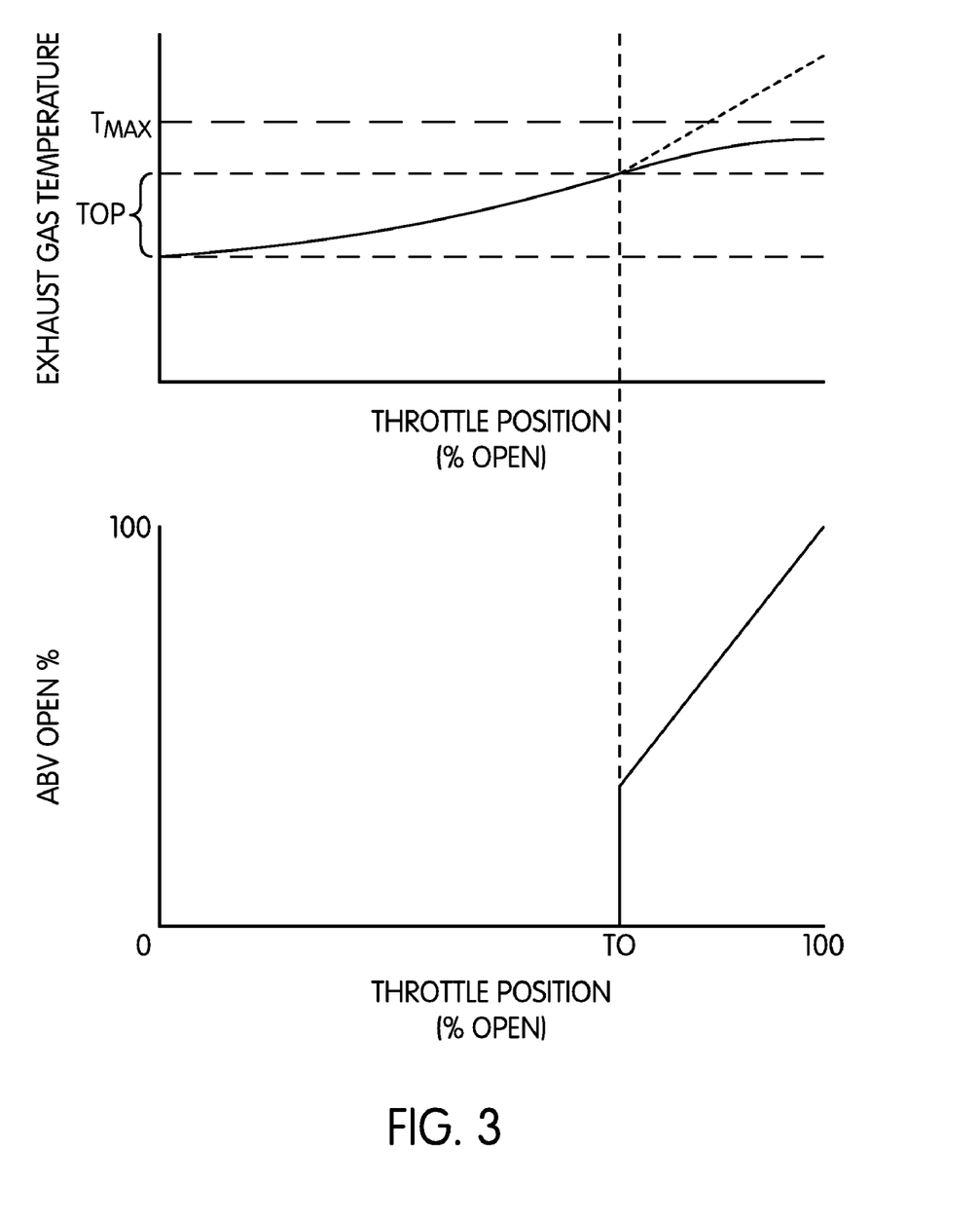
FIG. 3 are diagrams illustrating a relationship between throttle position and exhaust gas temperature according to an exemplary embodiment.

FIG. 3 are diagrams illustrating a relationship between throttle position and exhaust gas temperature according to an embodiment of method 200. Referring to FIG. 3, exhaust gas temperature can be predicted based on throttle position. In other embodiments, different engine operating conditions can be measured to predict the exhaust gas temperature.

When throttle 170 is opened to a predetermined throttle position, it can be assumed that engine 120 is emitting high temperature exhaust gas. When throttle 170 is opened beyond a predetermined throttle opening, the exhaust gas temperature may exceed an operational temperature range and approach a maximum temperature. As described above, the maximum temperature is a temperature beyond which catalytic converter 130 could be damaged. Air bypass valve 140 is opened when throttle 150 is beyond the predetermined throttle position.

As throttle 170 opens, it can be observed that the exhaust gas temperature rises within temperature operating range band. The dashed line indicates exhaust gas temperature if air bypass valve 140 was not opened. Without opening air bypass valve 140, the exhaust gas temperature would exceed the maximum temperature. However, because air bypass valve 140 is opened at predetermined threshold (TO), the exhaust gas temperature is reduced.

In addition, in some embodiments, air bypass valve 140 can be opened in response to compressor surge. An overpressure or compressor surge can occur when throttle 170 is quickly closed. The air is still being pressurized in air inlet passage 150 upstream of throttle 170 when throttle 170 is closed as turbocharger 110 is rotating at high speed and boost pressure may quickly increase. A compressor surge can damage turbine 110 or air inlet passage 150 because of the increase in pressure. The boost pressure in air inlet passage 150 can be vented to atmosphere to prevent damage from occurring.

Figure 4:
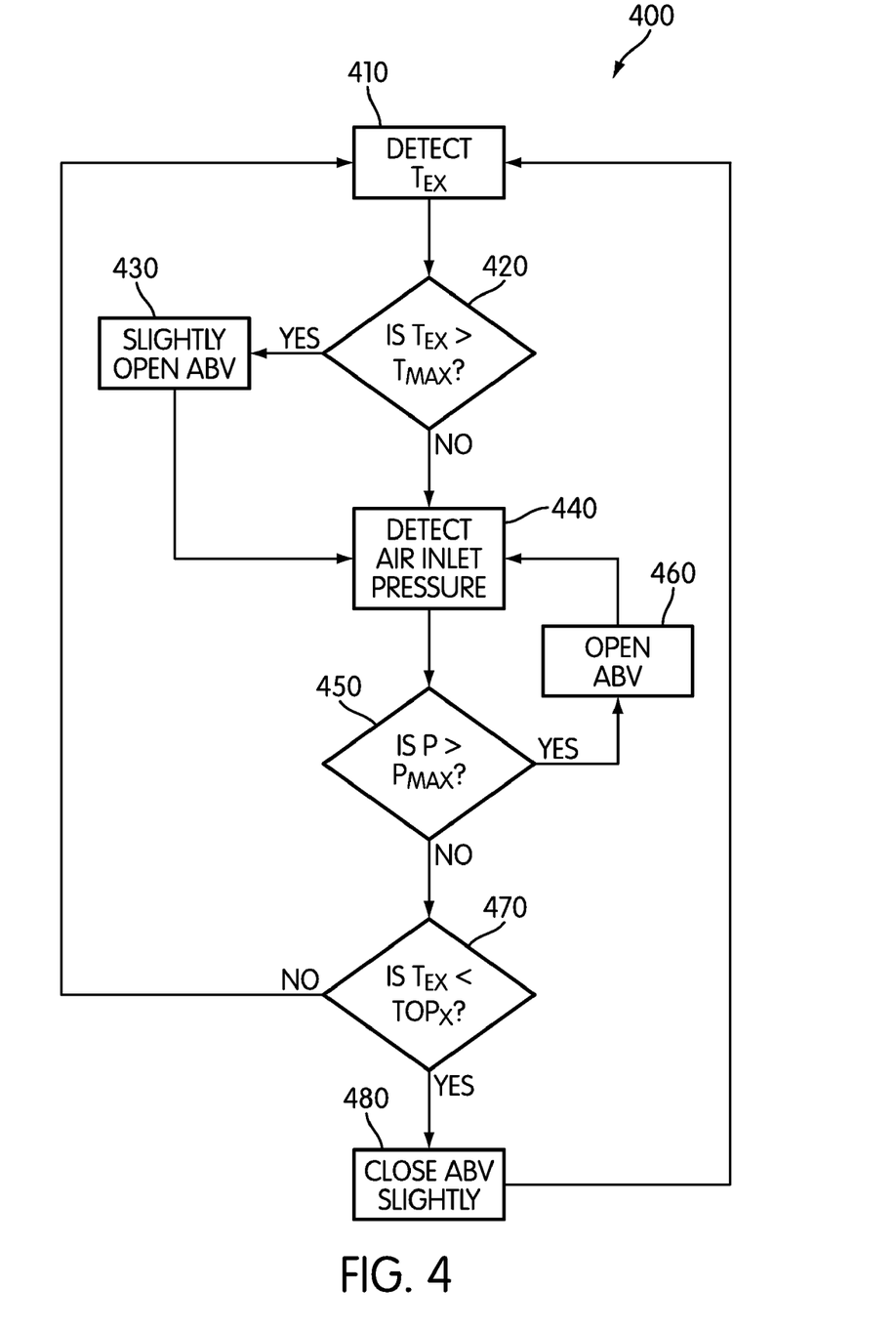
FIG. 4 is a schematic diagram according to an embodiment.

In some embodiments, air bypass valve 140 can be opened according to a sensed exhaust gas temperature. FIG. 4 is a schematic diagram according to another embodiment. Referring to FIG. 4, method 400 can be used to control air bypass valve 140 (see FIG. 1) based on input from exhaust gas temperature sensor 134. In some embodiments, air bypass controller 144 opens air bypass valve 140 by an amount that is in proportion to the exhaust gas temperature detected by exhaust gas sensor 134.

According to one embodiment of method 400, in step 410, the exhaust gas temperature (TEX) is detected. In step 420, the exhaust gas temperature (TEX) is compared to a maximum temperature (TMAX). If the exhaust gas temperature (TEX) exceeds the maximum temperature (TMAX), method 400 proceeds to step 430. In step 430, air bypass valve 140 is opened by a predetermined amount. If the exhaust gas temperature (TEX) is not greater than the maximum temperature (TMAX), method 400 proceeds to step 440 and the boost pressure (P) is measured. In step 450, the boost pressure (P) is compared to maximum boost pressure (PMAX).

If, in step 450, the boost pressure (P) is determined to exceed the maximum boost pressure (PMAX), method 400 proceeds to step 460. In step 460, air bypass valve 140 is opened by a predetermined amount. In some embodiments, air bypass valve 140 can simply be opened to 100% in step 460. After step 460, method 400 returns to step 440 and the boost pressure is measured.

On the other hand, if the boost pressure (P) is below the maximum boost pressure (PMAX), method 400 proceeds to step 470. In step 470, the exhaust gas temperature (TEX) is compared to an operational temperature (TOP). If the exhaust gas temperature (TEX) is less than the operational temperature (TOP), method 400 proceeds to step 480. In step 480, air bypass valve 140 is closed by a predetermined amount and method 400 returns to step 410. If the exhaust gas temperature (TEX) is not below the operational temperature (TOP), method 400 returns to step 410. In other embodiments, air bypass valve may close when the exhaust gas temperature (TEX) is at a temperature below the maximum temperature (TMAX).

Figure 5:
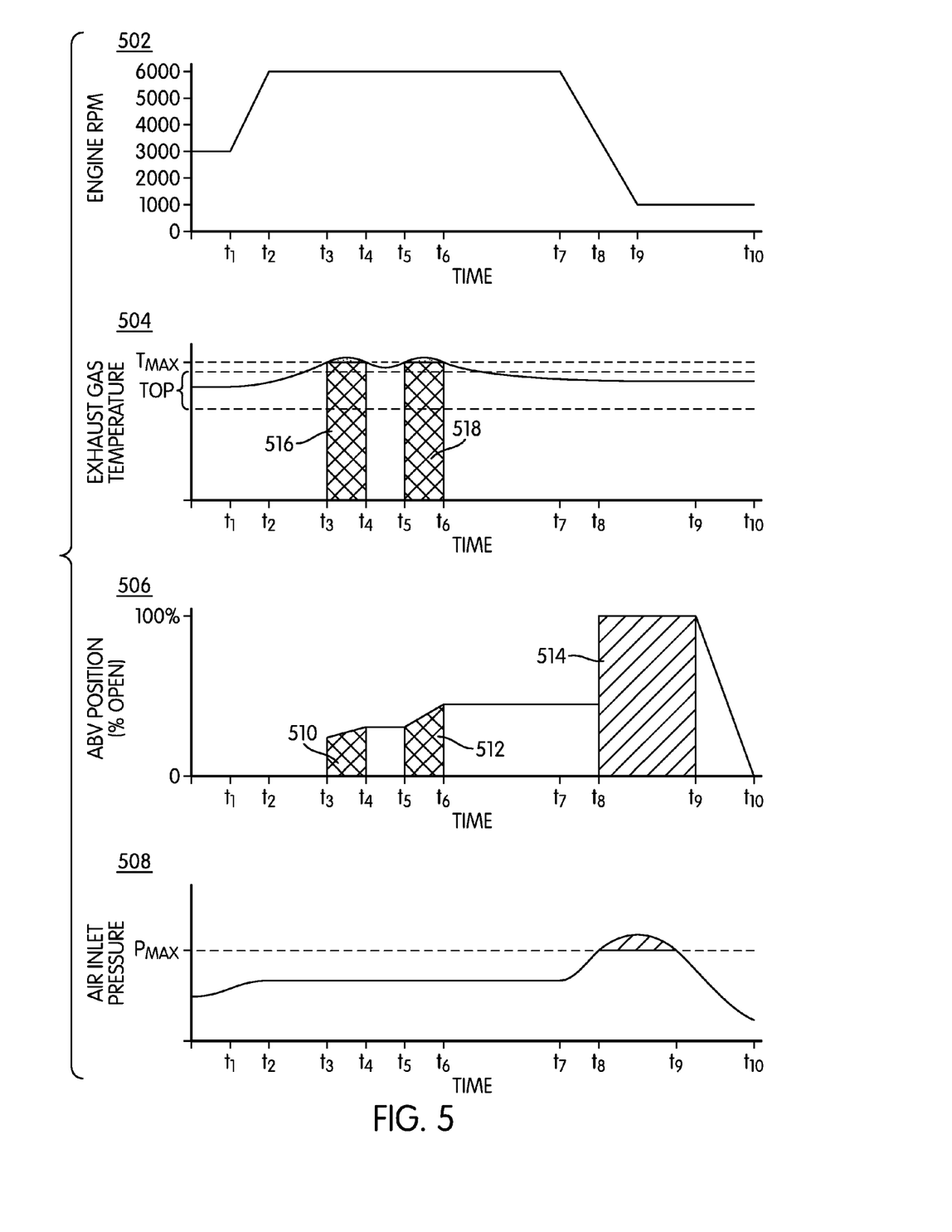
FIG. 5 are diagrams illustrating the relationship between air bypass valve opening, exhaust gas temperature, air inlet pressure, and engine speed over time according to an exemplary embodiment of FIG. 4.

FIG. 5 are diagrams illustrating the relationship between air bypass valve opening, exhaust gas temperature, air inlet pressure, and engine speed over time according to an exemplary embodiment of method 400 (see FIG. 4). Chart 502 describes engine speed in revolutions per minute over time. At time t1, the engine revolutions per minute increase until time t2, the engine enters a high output engine speed, for example 5500 revolutions per minute. The high output engine speed continues until time t7.

Referring to chart 504, the exhaust gas temperature is measured against time. At time t1, the exhaust gas temperature is within a normal operating temperature (TOP) range. The exhaust gas temperature rises from time t1 as the engine speed, generally measured in revolutions per minute, increase. At time t3, the exhaust gas temperature begins to exceed the maximum temperature (TMAX).

Referring to chart 506, the air bypass valve position is measured against time. The air bypass valve position remains at zero (0) until time t3 when the exhaust gas temperature exceeds the maximum temperature (TMAX). The air bypass valve position increases until the exhaust gas temperature falls below the maximum temperature (TMAX). As can be observed, the exhaust gas temperature continues to rise because of the high engine output. At time t5, the exhaust gas temperature again exceeds the maximum temperature (TMAX) and air bypass valve 144 is further opened. Referring to charts 504 and 506, shaded areas 510, 512, 516, and 518 indicate times at which the exhaust gas temperature exceeds the maximum temperature (TMAX). The maximum temperature at which air bypass valve 140 is opened can be calculated to compensate for an overshoot of the maximum temperature to protect catalytic converter 130.

At time t7, the high engine output event ends and the engine speed drops to a relatively low engine output, for example, 1000 revolutions per minute, at time t9. As can be observed, turbocharger 110 experiences a compressor surge when throttle 170 closes. Referring to chart 508, the boost pressure exceeds a maximum pressure (PMAX) at time t8. In order to protect turbocharger 110 from the compressor surge, air bypass valve 140 is opened. For example, air bypass valve 140 can be opened to 100 percent. The air bypass position may remain at 100 percent open until time t9 when air inlet pressure drops below the maximum pressure (PMAX). Area 514 in charts 506 and 508 indicate a time when turbocharger 120 and air inlet experience compressor surge.

At time t9, the exhaust gas temperature falls enters the operational temperature range (TOP). The air bypass valve position begins to close in response to the fall of the exhaust gas temperature within the operation temperature (TOP). At time t9, engine 120 enters the low output state and at time t10, the air bypass valve returns to a fully closed position at zero (0) percent open.

Figure 6:
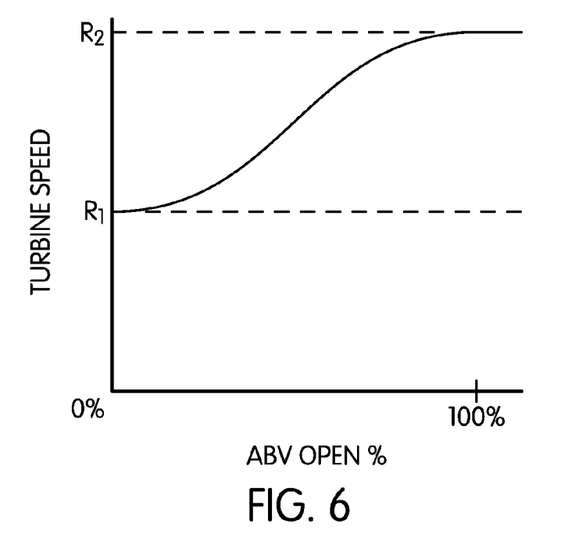
FIG. 6 is a chart illustrating a relationship between engine speed and the air bypass valve position according to an exemplary embodiment.

FIG. 6 is a chart illustrating a relationship between turbocharger speed and the air bypass valve open position according to an exemplary embodiment. In a high output engine state, turbocharger 110 can respond to an open air bypass valve 140 (see FIG. 1) by increasing rotational velocity to compensate for lost air and to maintain boost pressure. Referring to FIG. 6, assuming a constant engine speed, a relationship between air bypass valve 140 and the turbine speed is shown. As air bypass valve 140 opens, turbocharger 110 increases in rotational speed from first turbocharger speed R1 to second turbocharger speed R2.

First turbine speed R1 can be the rotational speed required for compressor 116 to maintain a desired boost pressure where air bypass valve 140 is closed. At a fully closed air bypass valve position, compressor 116 is only compensating for air lost to engine 120. Second turbine speed R2 can be the rotational speed required for compressor 116 to maintain the desired boost pressure when air bypass valve is fully open. At the fully open air bypass valve position, compressor 116 is compensating for air lost through air bypass valve 140 and air consumed by engine 120. As air bypass valve 140, turbocharger speed increases from first turbochargers speed R1 to second turbocharger speed R2.

Figure 7:
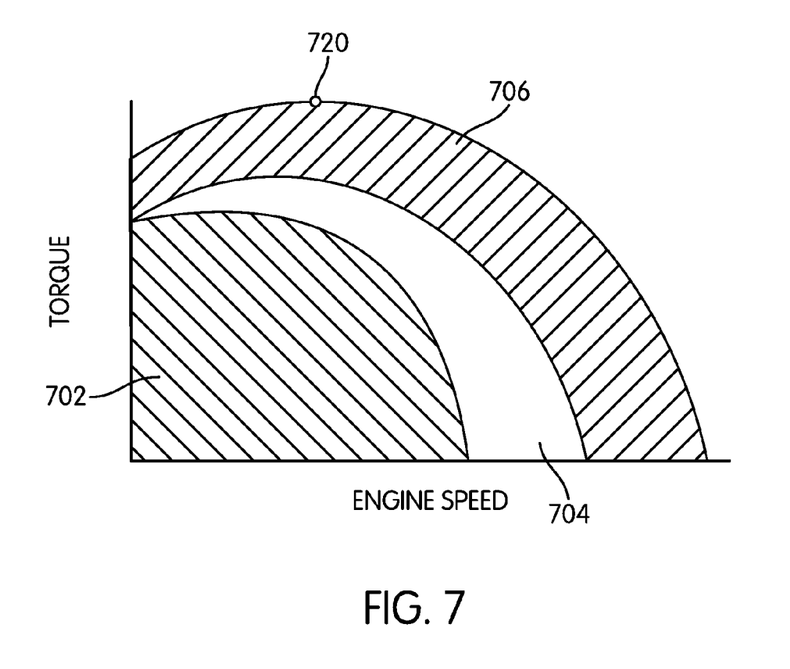
FIG. 7 is a chart illustrating a relationship between turbocharger speed and torque according to an exemplary embodiment.

FIG. 7 is a chart illustrating a relationship between engine speed and torque according to an exemplary embodiment. Referring to FIG. 7, engine speed is graphed against torque to illustrate effective exhaust gas cooling techniques. Point 720 is the max torque point for the engine of FIG. 7. First region 702 illustrates an engine operating region of relatively low engine speed and torque. Because first region 702 has relatively low engine output, the exhaust gas has a relatively low exhaust gas temperature. Accordingly, in first region 702 on FIG. 7, no special exhaust gas cooling is required to protect catalytic converter 130.

Second region 704 of FIG. 7 illustrates an area of engine torque and speed having an increased exhaust gas temperature. The exhaust gas from the second region may require cooling to protect catalytic converter 130. In the second region, air bypass valve 140 can vent the boost air to the atmosphere to increase a speed of turbocharger 110. As described above, increasing the speed of turbocharger 110 extracts energy from the exhaust gas, lowering the temperature of the exhaust gas. Thus, in the second region, exhaust gas temperature can be reduced by opening air bypass valve 140 without having to enrich the fuel to air ratio. As a result, the present invention helps to improve fuel economy.

Third region 706 of FIG. 7 depicts an engine operating area in which the exhaust gas temperature is greater than in either of the first two regions. In third region 706, air bypass valve 140 can be opened to cool the exhaust gas, but the exhaust gas may require additional cooling to protect catalytic converter 120 from extreme exhaust gas temperatures. Accordingly, in third region 706, the fuel to air ratio in engine 120 may be enriched and air bypass valve 140 opened to reduce the exhaust gas temperature of the exhaust entering catalytic converter 120.

In some embodiments, engine 120 receives fuel from a fuel injection system 145, as shown in FIG. 1. The fuel injection system 145 can include electronic fuel injectors, carburetors, and other known fuel delivery systems. Generally, the fuel injection system 145 may be operated in various fuel states. In some cases, fuel injection system 145 can be operated in a stoichiometric state. A stoichiometric state is a state with a fuel to air in an engine's cylinder to completely and efficiently burn the fuel in the cylinder. For a typical gasoline engine, the stoichiometric ratio is one part fuel for every 14.7 parts air. In some cases, fuel injection system 145 can provide fuel to the engine in a lean state. The lean state is defined as an air to fuel ratio substantially greater than the stoichiometric ratio. In still other cases, fuel injection system 145 can provide fuel to the engine in an enriched state. The enriched state is defined as an air to fuel ratio substantially less than the stoichiometric ratio.

The present invention helps protect a catalytic converter in a turbocharged engine while enabling the engine to operate various fuel states. In the lean state, for example, fuel consumption is improved as less fuel is consumed per stroke, however, exhaust gas temperature is increased. On the other hand, in the enriched state, the fuel to air ratio greater than the stoichiometric ratio. An engine operating in an enriched state generally has lower exhaust gas temperatures but consumes more fuel per stroke. A turbocharged engine according to the present invention can operate longer at a high output state while maintaining a lean fuel mixture. And the turbocharged engine according to the present invention can maintain low engine emissions as the exhaust gas temperature entering the catalytic converter is within a preferred operating range at the high output state.

While various embodiments of the invention have been described, it will be apparent to those of ordinary skill in the art that more embodiments and implementations are possible that are within the scope of the invention.

What is claimed is:

1. A turbocharged engine system, comprising:
an engine;
an air inlet to provide air to the engine;
an air bypass valve that vents air from the air inlet directly to the atmosphere;
a turbocharger disposed in the air inlet;
a catalytic converter located downstream of the engine;
an air bypass valve controller to open the air bypass valve when an exhaust gas temperature from the engine entering the catalytic converter exceeds a predetermined temperature; and
wherein the turbocharger is configured to rotate faster to maintain air pressure when opening the air bypass valve.

2. The turbocharged engine system of claim 1, wherein the air bypass valve controller predicts the exhaust gas temperature.

3. The turbocharged engine system of claim 2, further comprising at least one sensor,
wherein the air bypass valve controller predicts the exhaust gas temperature based on information received from the at least one sensor.

4. The turbocharged engine system of claim 1, further comprising an exhaust gas temperature sensor,
wherein the exhaust gas temperature sensor measures the exhaust gas temperature and transmits the measured exhaust gas temperature to the air bypass controller.

5. The turbocharged engine system of claim 4, wherein the air bypass controller is configured to open the air bypass valve by an amount in proportion to the measured exhaust gas temperature.

6. The turbocharged engine system of claim 1, further comprising a fuel injection system,
wherein the fuel injection system is configured to provide fuel to the engine in a lean state when the air bypass valve is opened.

7. A method for cooling exhaust from a turbocharged engine, comprising the steps of:
determining the temperature of an engine exhaust gas;
determining if the predicted exhaust gas temperature is above a predetermined temperature; and
venting pressurized intake air to a portion of an air inlet upstream of the turbocharger if the predicted temperature is above the predetermined temperature.

8. The method of claim 7, further comprising spinning the turbocharger to maintain air pressure upstream of the turbocharger while the pressurized air is further vented to the atmosphere.

9. The method of claim 7, wherein the step of determining the exhaust gas temperature includes measuring the exhaust gas temperature.

10. The method of claim 7, wherein the step of determining the exhaust gas temperature includes predicting the exhaust gas temperature according to engine operating conditions.

11. The method of claim 7, further comprising:
providing a fuel air mixture to the engine during the step of venting.

12. The method of claim 7, wherein the pressurized air is further vented directly to the atmosphere if the predicted temperature is above the predetermined temperature.

13. The method of claim 7, further comprising:
measuring a boost pressure;
determining if the boost pressure is falling; and
reducing the venting of the pressurized air if the boost pressure is determined to be falling.

14. The method of claim 7, further comprising:
measuring a boost pressure;
determining if the boost pressure exceeds a predetermine boost pressure limit; and
venting the pressurized air if the measured boost pressure exceeds the predetermined boost pressure limit.

15. The method of claim 14, wherein the venting includes opening an air bypass valve upstream of the engine and downstream of the turbocharger.

16. The method of claim 7, further comprising:
determining if the determined exhaust gas temperature is below a predetermined lower temperature limit; and
closing an air bypass valve if the determined exhaust gas temperature is below the predetermined lower temperature limit.

17. A turbocharged engine system, comprising:
an engine;
an air inlet to provide air to the engine;
a turbocharger having an impeller to pressurize air entering through the air inlet to the engine and a turbine to convert exhaust gas from the engine into rotational energy to spin the impeller;
a bypass valve disposed between the impeller and the engine, the bypass valve configured to selectively vent the pressurized air to at least one of directly to the atmosphere or a portion of the air inlet upstream of the impeller; and
a bypass controller configured to determine exhaust gas temperature from the engine and to open the bypass valve when the engine exhaust temperature exceeds a predetermined temperature.

18. The turbocharged engine system of claim 17, wherein the air bypass valve vents the pressurized air directly to atmosphere when the engine exhaust gas temperature exceeds a predetermined temperature.

19. The turbocharged engine system of claim 17, wherein:
the bypass controller is configured to determine if a turbine overpressure event is occurring; and wherein
the bypass controller opens the bypass valve when the turbine overpressure event occurs.

20. The turbocharged engine system of claim 19, wherein the air bypass valve is configured to vent the pressurized air to the portion of the air inlet upstream of the turbocharger during the turbine overpressure event.

21. The turbocharged engine system of claim 17, wherein the engine is configured to maintain a lean operating state when the engine operates at a high engine output associated with an engine speed greater than 1000 rpm and less than a maximum engine speed to maintain a predetermined exhaust gas temperature.

22. The turbocharged engine system of claim 21, wherein the engine is configured to operate in an enriched state after the air bypass valve is opened and the engine exhaust temperature is greater than the predetermined exhaust gas temperature.

* * * * *